United States Patent
Kalwa et al.

(10) Patent No.: US 10,063,747 B2
(45) Date of Patent: Aug. 28, 2018

(54) METHOD FOR ADJUSTMENT OF DECORATIVE PRINTING USING MEASURED COLOR VALUES OF FIRST AND SECOND PRIMER APPLIED WOOD MATERIAL BOARDS AND APPARATUS FOR CARRYING OUT THE SAME

(71) Applicant: Flooring Technologies Ltd., Pieta (MT)

(72) Inventors: Norbert Kalwa, Horn-Bad Meinberg (DE); Timo Skorzik, Gotha (DE)

(73) Assignee: Flooring Technologies Ltd., Kalkara (MT)

( * ) Notice: Subject to any disclaimer, the term of this patent is extended or adjusted under 35 U.S.C. 154(b) by 554 days.

(21) Appl. No.: 14/695,429

(22) Filed: Apr. 24, 2015

(65) Prior Publication Data

US 2015/0306888 A1   Oct. 29, 2015

(51) Int. Cl.
| | |
|---|---|
| H04N 1/60 | (2006.01) |
| H04N 1/00 | (2006.01) |
| B05D 5/06 | (2006.01) |
| B05D 3/12 | (2006.01) |
| B05D 7/06 | (2006.01) |

(Continued)

(52) U.S. Cl.
CPC .......... *H04N 1/6008* (2013.01); *B05D 3/12* (2013.01); *B05D 5/06* (2013.01); *B05D 5/061* (2013.01); *B05D 7/06* (2013.01); *B32B 38/145* (2013.01); *B41J 3/407* (2013.01); *B41J 11/0015* (2013.01); *B41M 5/0017* (2013.01); *B41M 5/0041* (2013.01); *B41M 5/0047* (2013.01); *B41M 5/0076* (2013.01); *B44C 3/005* (2013.01); *B44C 5/04* (2013.01); *B44C 5/0461* (2013.01); *H04N 1/00015* (2013.01); *H04N 1/00023* (2013.01); *H04N 1/00034* (2013.01); *H04N 1/00068* (2013.01); *H04N 1/00082* (2013.01); *H04N 1/603* (2013.01); *H04N 1/6097* (2013.01)

(58) Field of Classification Search
None
See application file for complete search history.

(56) References Cited

U.S. PATENT DOCUMENTS

| | | | |
|---|---|---|---|
| 7,001,016 B2 | 2/2006 | Baxter et al. | |
| 9,156,308 B2 * | 10/2015 | Kalwa | B41M 5/0047 |

(Continued)

FOREIGN PATENT DOCUMENTS

| | | |
|---|---|---|
| WO | 03084760 A1 | 10/2003 |
| WO | 2013165307 A1 | 11/2013 |

*Primary Examiner* — Scott A Rogers
(74) *Attorney, Agent, or Firm* — The Webb Law Firm

(57) ABSTRACT

Disclosed is a method for printing wood material boards. The method includes: by a digital printing process, measuring color values of the wood material boards from at least one first batch and forwarding the color values to a computer program; measuring color values of the wood material boards from at least one further batch and forwarding the color values to the computer program; processing the color values of the wood material boards from the at least one further batch in the computer program and adapting the color values of the digital print; and printing at least one side of the wood material boards by means of digital printing technology, forming a decorative layer in such a way that no color deviations occur between the printed decorations of the wood material boards.

22 Claims, 2 Drawing Sheets

(51) Int. Cl.
  *B32B 38/00*   (2006.01)
  *B41M 5/00*   (2006.01)
  *B44C 3/00*   (2006.01)
  *B44C 5/04*   (2006.01)
  *B41J 11/00*  (2006.01)
  *B41J 3/407*  (2006.01)

(56) References Cited

U.S. PATENT DOCUMENTS

| | | | |
|---|---|---|---|
| 9,248,683 B2* | 2/2016 | Kalwa | B41M 5/0047 |
| 9,259,762 B2* | 2/2016 | Mizuno | B44F 9/02 |
| 2012/0251787 A1 | 10/2012 | Mizuno | |
| 2013/0240137 A1* | 9/2013 | Kalwa | B41M 3/008 |
| | | | 156/267 |
| 2014/0255670 A1* | 9/2014 | Kalwa | B05D 7/08 |
| | | | 428/205 |
| 2015/0097907 A1* | 4/2015 | Kalwa | B41M 5/0047 |
| | | | 347/110 |
| 2015/0306888 A1* | 10/2015 | Kalwa | B41J 3/407 |
| | | | 428/537.1 |
| 2015/0360494 A1* | 12/2015 | Kalwa | B41M 5/0047 |
| | | | 347/15 |

* cited by examiner

METHOD FOR ADJUSTMENT OF DECORATIVE PRINTING USING MEASURED COLOR VALUES OF FIRST AND SECOND PRIMER APPLIED WOOD MATERIAL BOARDS AND APPARATUS FOR CARRYING OUT THE SAME

CROSS-REFERENCE TO RELATED APPLICATION

This application claims priority to European Patent Application No. 14 165 828.6-1704 filed Apr. 24, 2014, the disclosure of which is hereby incorporated in its entirety by reference.

The present invention relates to a method for adapting decorative prints and a device for carrying out said method.

DESCRIPTION

Carrier materials provided with a decoration, such as wood material boards, are typically used as floor-covering elements or for cladding walls and ceilings. For this purpose, in the past the wood material boards used as carrier materials were normally coated with a decorative paper, no limits having been or being set on the many differently patterned decorative papers.

As an alternative to the use of decorative papers on wood material boards, the direct printing of wood material boards as carrier materials has been developed in the past, since the printing of paper and the subsequent lamination or direct coating thereof onto the wood material board is dispensed with.

The printing techniques mainly used in this case are the gravure printing process and the digital printing process. The gravure printing process is a printing technique in which the elements to be depicted are present as depressions in a printing form, which is inked before the printing. The printing ink is primarily located in the depressions and, on account of contact pressure of the printing form and of adhesive forces, is transferred to the object to be printed, such as a carrier material. In the case of digital printing, on the other hand, the printing image is transferred directly from a computer into a printing press such as a laser or inkjet printer. In this case, the use of a static printing form is dispensed with.

Within the context of the technical further development of the printing technology of an extremely wide range of carrier materials, however, more and more is placed on digital printing. While digital printing processes were initially primarily applied in the graphical industry such as advertising agencies, advertising material producers or print shops, in the meantime it has been shown that digital printing processes are also to be met more frequently in other industrial sectors. Although there are many and various reasons for this, it is possible to detect two substantial arguments. For example, digital printing permits the production of a printed image with a particularly high quality by means of a higher resolution and, furthermore, permits a wider range of applications with high flexibility.

Digital printing is carried out nowadays virtually exclusively by using the CMYK color system. The CMYK color model is a subtractive color model, the abbreviation CMYK standing for the three color constituents cyan, magenta, yellow and the black component key as color depth. By using this color system, it is possible to depict a color space (gamut) which satisfies many requirements from an extremely wide range of sectors.

Furthermore, products are firstly intended to become more economical as a result of mass production and, secondly, a greater variety is expected by the customers and, for example, is reflected in a virtually infinite variety of decorations. A considerable problem is a prediction which has to be made by a producer, for example of decorative surfaces for articles in use, such as laminate floors, with regard to the question as to which new decorations will be accepted by customers and which will not.

During the reconfiguration of a collection, a producer of decorative boards has to accept a minimum quantity of printed decorative paper or printed finished film from each decoration. The minimum quantity in the case of paper is normally within the area of about one tonne, which corresponds to about 15 000 m$^2$. This decorative paper then has to be impregnated, pressed onto carrier boards and processed further. If, then, it is precisely this decoration which has no success on the market, residual quantities which can no longer be used arise at all value creation stages. The costs arising from this are considerable. In addition, the coloring of the decoration was defined, at least for the one tonne of paper.

One possible way of solving this problem would be the production of all decorations exclusively by means of digital printing. However, this then has the serious disadvantage that these decorations are considerably more expensive in relation to the printing costs. Furthermore, the higher quality level of the decorations as a result of the higher resolution of the digital printing could reduce the value of other, non-digitally printed decorations, and thus lead to a downturn in sales of conventionally printed carrier materials.

A trend that is becoming more intensive consists in batch sizes that are becoming smaller and smaller. In principle, digital printing technology can also take account of this trend. As a result of the high flexibility of digital printing, it is not only possible to print paper or film webs but also carrier boards, such as wood fiber boards, directly. Therefore, on the way to the further finishing of semi-finished or finished products, such as furniture boards, laminate floors or facade boards, some value creation stages can be skipped, which opens into further flexibilization and simplification of the fabrication processes.

In particular in the wood material industry, until now decorative surfaces have been produced virtually exclusively by indirect gravure printing on decorative papers and therefore increasingly batch size problems had to be countered.

Digital printing offers a way out here. This is currently being propagated virtually exclusively, like indirect gravure printing, on decorative paper or on previously impregnated, such as previously resin-treated, papers. Here, use is predominantly made of inks based on water, which still have a certain solubility in water even following the printing and the subsequent drying. Since, during the following production of the decorative surfaces, at least in decorative papers, impregnation with water-soluble resins must still be performed, followed by pressing in a short-cycle press, the high resolution is partially impaired or destroyed by the dissolution of the colors.

Direct printing on a carrier board, pre-primed where necessary, preferably a wood material board, by means of digital printing would therefore be a solution worth aiming at.

However, in the realization of this solution, a number of obstacles have to be overcome.

The decorative papers used for indirect gravure printing have a good covering power because of their relatively high pigment loading. Therefore, the natural color of the carrier should largely be eliminated. Alternatively, a primer can be applied directly to a carrier board. If a primer is applied directly to a carrier board, preferably a wood material board, the priming must not be carried out too thickly on the carrier board, since otherwise the protective layers applied later, preferably synthetic resins, can no longer penetrate the primer and therefore, after pressing in the short-cycle press, delamination or bubbles can occur.

On the other hand, the priming must not be carried out too thinly either. There is then the danger that the carrier will not be covered completely, which has a detrimental effect on the overall color impression of the decoration.

A further problem consists in the fact that individual batches of the carrier materials exhibit fluctuations in their properties, which, amongst other things, can lead to differences in the lightness and/or the color of the carrier boards. As a result, following the printing of the decorations, visible differences can occur, in particular color deviations, between the individual product batches.

Attempts were initially made to solve this problem by applying a plurality of layers of a white primer to the carrier materials. The white primer can be applied to the carrier materials, for example by using one or more roll applicator machines. The number of layers of the white primer is preferably up to six layers. For the subsequent printing of light decorations, it is necessary to apply a primer that is as light as possible, preferably a white primer, to the carrier materials. The white primers used normally have white pigments such as titanium dioxide as pigments. For dark decorations, such as bog oak or mahogany, a yellow to light brown primer can also be applied. For this purpose, the pigments contained in the primer are, for example, titanium dioxide and/or iron oxide.

Nevertheless, the primers for direct printing on carrier materials do not reach the same quality level as that of a conventional decorative paper. In particular in the case of white primers, a greater cloudiness and/or a lower covering power was to be observed, as a result of which the carrier material to be printed shows through. The process for achieving a uniform whiteness, in particular within one board of the carrier material, can be controlled only with difficulty and, following the application of the decoration, deviations result in the printed image, which leads to rejects. Therefore, a very complicated visual check of the carrier materials is necessary following the application of the primer, in particular white primer. White primers must be used in most cases, however, since they ensure the desired brilliance, in particular in the case of light decorations. However, it is precisely in flooring collections that the proportion of light decorations is relatively high.

The invention is therefore based on the technical object of priming large-format carrier materials, such as wood material boards, in such a way that deviations of the whiteness within a board are largely avoided and the subsequent decoration thereof can be carried out without visible deviations of the printed image from board to board. The technical and monetary outlay should be as low as possible. In addition, the process should not differ substantially from the standard process.

SUMMARY OF THE INVENTION

Accordingly, the invention provides a method for producing decorative prints with the same quality on carrier materials, the lightness and/or color of which are subject to fluctuations, a constant quality, in particular color, of the decorative prints being achieved irrespective of fluctuations in the lightness and/or the color of the carrier materials.

Color deviations in the printed motif of the decorations printed by means of digital printing occur in the production process, in particular following the change from one batch of the carrier material to a new batch of the carrier material. However, color deviations can also occur between individual carrier boards or a plurality of carrier boards from the same batch of the carrier material. Likewise, as already described above, color deviations can also occur within one board of the carrier material, however, if the white priming has been carried out insufficiently or if the white primer is not sufficient to compensate for the color differences occurring on the surface of individual carrier boards.

To correct color deviations between the carrier boards from various batches of the carrier material, in the method according to the invention firstly the color values of the carrier boards from at least one batch of the carrier material are measured continuously and forwarded to a computer program. When the batch of carrier material is changed, the color values of the carrier boards of at least one further batch of the carrier material are measured continuously and likewise forwarded to the computer program. The color values from the carrier boards from the at least one first batch and the at least one further batch of the carrier material are processed in the computer program. In the event that color deviations occur between the carrier boards from the at least one first batch and at least one further batch of the carrier material, the color values of the digital printing for the decorations from the at least one further batch and/or the at least one first batch of the carrier material are adapted. This ensures that no color deviations occur between the printed decorations of the at least one first batch of the carrier material and each further batch of the carrier material.

The carrier material used in the present method can be selected from a group containing paper, glass, metal, films, wood materials, in particular MDF or HDF boards, veneers, coating layers, synthetic boards and inorganic carrier boards, such as cement bonded particle board, cement fiber boards and plaster fiber boards.

Preferably, use is made of wood material boards, in particular wood fiber material boards.

According to the invention, a method for printing wood material boards, in particular wood fiber material boards, by means of a digital printing process is therefore provided.

The measurement of the color values is preferably carried out continuously in the method according to the invention.

DETAILED DESCRIPTION OF THE INVENTION

Figure 1:
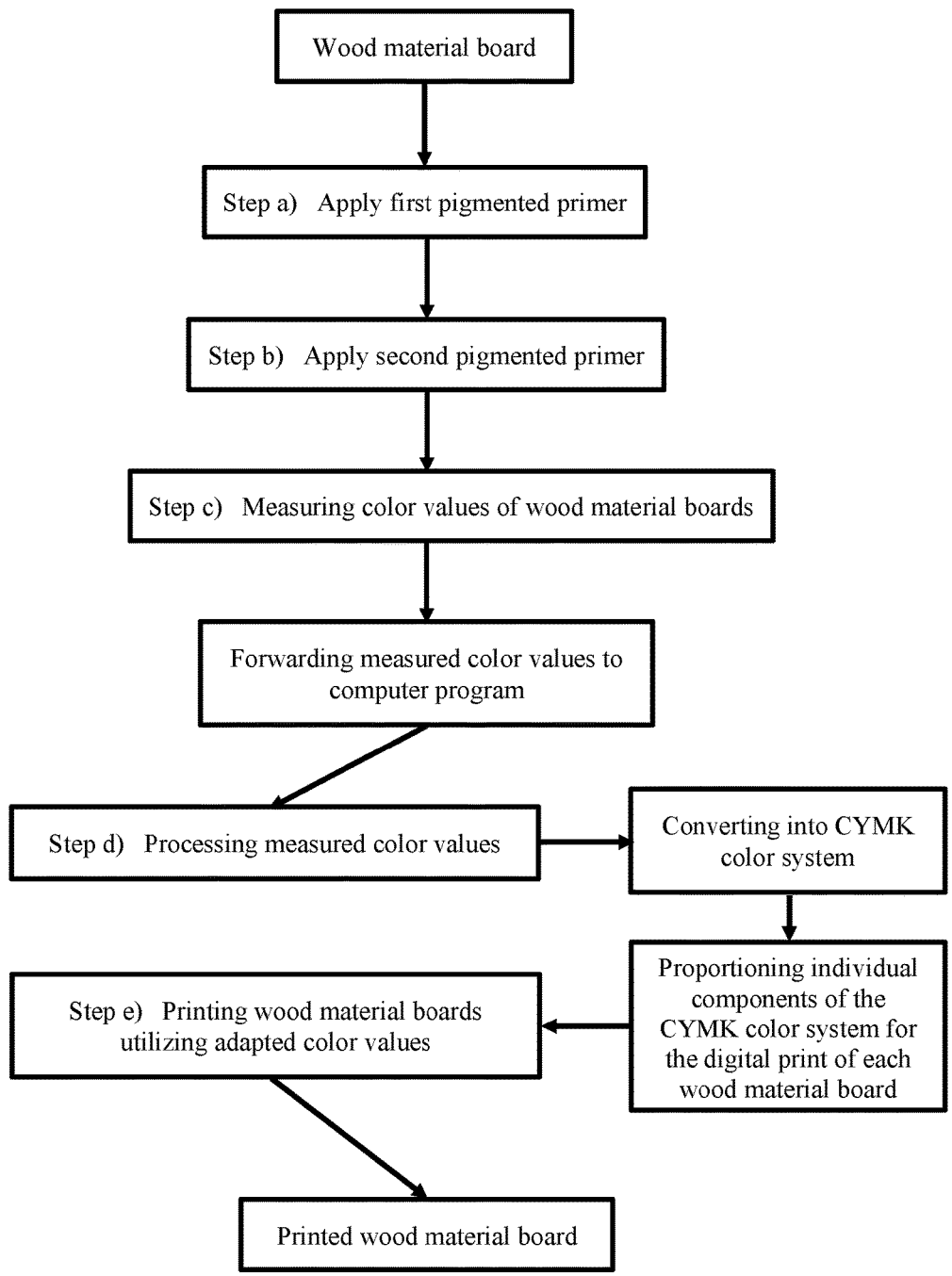
FIG. 1 is a process-flow diagram showing an embodiment of a method according to the present invention.

The following is a discussion of the process illustrated in FIG. 1.

In one embodiment of the present method, before the printing, at least one primer layer comprising at least one resin and/or at least one coating, which is subsequently dried and/or cured, is applied to the side of the wood material board that is to be printed.

Preferably, the side of the wood material board that is to be printed is ground before the application of the primer.

For the priming, an aqueous resin solution and/or a radiation-curable filler compound can be applied to the side of the carrier material that is to be printed. The priming agent that can be used is, for example, aqueous resin solutions such as melamine formaldehyde resin, urea formaldehyde resin or melamine urea formaldehyde resin. It is likewise possible to pre-coat or to prime the carrier material with 1K/2K acrylate, UV and/or ESH filler and then to cure this primer layer appropriately.

Preferably, for the pre-coating or priming of the wood material board, use is made of an aqueous resin solution, in particular an aqueous solution of a melamine formaldehyde resin, urea formaldehyde resin or melamine urea formaldehyde resin.

The application quantity of liquid resin solution for the priming can be between 10 and 80 g/m$^2$, preferably 20 and 50 g/m$^2$. The solids content of the aqueous resin solution lies between 30 and 80%, preferably 40 and 60%, in particular preferably at 55%. The liquid resin can additionally have suitable wetting agents, hardeners, release agents and defoamers.

Following application of the aqueous resin solution to the wood material board for the purpose of pre-coating or priming the same, the liquid resin is dried to a moisture content of 10%, preferably 6%, for example in a convection oven or near infrared oven.

In another embodiment of the present method, the wood material board can be pre-coated or primed with 1K/2K acrylate and/or ESH filler. A UV filler compound is advantageously composed substantially of UV-curable coating components, pigments, reactive thinners and radical formers as chain starters.

The application quantity of the filler compound in this case can be 25 to 150 g/m$^2$, preferably 30 to 100 g/m$^2$. In this case, the quantity statements relate to a 100% filler compound.

It is likewise possible for the filler compound used for the priming to be present in pigmented form, by which means the printed result can be varied or improved.

Particularly preferred according to the invention is the pre-coating of the wood material board with a transparent primer.

In a further embodiment of the present method, before the printing of the at least one side of the wood material board, at least one layer of a pigmented primer, which is preferably water-based, is applied to the side of the wood material board that is to be printed. The pigmented primer can either be applied directly to the untreated surface of the material board or else to the previous, preferably transparent, primer.

The water-based pigmented primer can also be applied in more than one layer (e.g. 3 to 10 layers, preferably 5 to 8 layers, particularly preferably 6 or 7 layers), wherein, following each layer application, the pigmented primer is dried, for example in a convection dryer or a near infrared dryer. The water-based pigmented primer preferably contains at least one pigment of a light color, in particular at least one white pigment.

White pigments are uncolored inorganic pigments having a high refractive index (greater than 1.8) which are primarily used to produce optical whiteness in coating media or as fillers in synthetic materials, for example. White pigments according to the invention can be selected from the group comprising titanium dioxide, lithopone, barium sulfate, zinc oxide, zinc sulfide and calcium sulfate. Lithopone is a white pigment which contains barium sulfate and zinc sulfide.

The method according to the invention is particularly environmentally friendly, since no compounds which contain toxic heavy metals are used as white pigments.

According to the invention, titanium dioxide is preferably used as white pigment in the water-based pigmented primer, since titanium dioxide exhibits the highest refractive index and thus the highest covering power among the known white pigments.

However, color differences between the boards of different batches, but in particular between different areas on the surface of a wood material board, cannot always be reliably avoided by the application of a water-based pigmented primer which contains white pigments to wood material boards.

In a preferred embodiment of the invention, a layer of the water-based pigmented primer is therefore implemented as a gray color primer. It is particularly preferable if the pigmented gray color primer is applied to the wood material board before the application of one or more further pigmented primer layers of white color.

As a result, a higher opacity and homogeneity of the primer on the wood material board is produced, which leads to improved color agreement between the subsequently applied decoration over the entire board area.

Opacity means "non-transparency". The opacity of the primer is high if the primer is not translucent, i.e. if the color of the material of the wood material cannot be seen through the primer. The opacity can be affected by the color and thickness of the primer.

A water-based pigmented primer of gray color can be produced in a straightforward way, for example by the water-based pigmented primer, which contains one or more white pigments, having black printing ink added, the black printing ink preferably being water based. Different gray steps, based on the lightness of the gray color primer, can likewise be produced in a straightforward way by the quantity of black printing ink that is added being varied. Depending on the requirements, 1 to 700 g/l black printing ink is added to the water-based pigmented primer, which contains one or more white pigments. Preferably, 1 to 600 g/l; 1 to 500 g/l, 1 to 400 g/l, 1 to 300 g/l, 1 to 200 g/l or 1 to 100 g/l black printing ink is added to the water-based pigmented primer which contains one or more white pigments. In a further preferred embodiment, 1 to 90 g/l, 1 to 80 g/l, 1 to 70 g/l, 1 to 60 g/l, 1 to 50 g/l, 1 to 40 g/l, 1 to 30 g/l, 1 to 20 g/l or 1 to 10 g/l black printing ink is added to the water-based pigmented primer which contains one or more white pigments. In principle, all water-based gray colors which can be printed by means of an inkjet printer are suitable for use in the method according to the invention.

The assessment of the uniformity of the priming is carried out by determining the color deviations by means of color measurement following the application of one or more layers of the pigmented primer.

To determine color deviations, the color difference ($\Delta E$) is used. The color difference ($\Delta E$) indicates the difference between two colors. Considered mathematically, the color difference is the shortest connection present in the CIE color space between two color loci (DIN 5033-2, 1992). A color locus can be assigned to each color with the aid of the standard chromaticity diagram and a color measurement system. If the color difference is known, it is possible to make an unambiguous statement as to how highly two colors differ from each other. The color difference can be determined with conventional physical methods. However, it is primarily a matter of the perceptibility of color differences by humans.

Preferably, the method according to the invention is carried out in such a way that only tolerable color deviations occur between the printed decorations of the wood material boards from the at least one first batch and each further batch or the at least one first wood material board and each further wood material board.

According to the present invention, color deviations between the printed decorations of the wood material boards from the at least one first batch and each further batch or the at least one first wood material board and each further wood material board are tolerable when the color difference (ΔE) is not perceived as different by humans or is only very low. The color deviations are preferably in a range which is not perceived by humans. In a further preferred embodiment, the method according to the invention is accordingly carried out in such a way that only small color deviations occur between the printed decorations of the wood material boards from the at least one first batch and each further batch or the at least one first wood material board and each further wood material board. In a particularly preferred embodiment, the method according to the invention is carried out in such a way that the color deviations between the printed decorations of the wood material boards from the at least one first batch and each further batch or the at least one first wood material board and each further wood material board of one and the same batch are so small that they are barely perceptible by humans.

The impression of a decoration, and therefore the perceptibility of color differences, can vary with different observers. Therefore, during the assessment of color differences by a person skilled in the art, it is a matter of excluding as many external influences as possible and configuring the assessment of color differences as objectively as possible as a result. This can be achieved, for example, by the assessment of color differences being carried out under standardized conditions in a repeatable manner.

Such a standardized assessment of color differences, known to those skilled in the art, can comprise, for example,
- the comparative observation of the printed wood material boards,
- in a darkened measuring cabinet with the exclusion of incident stray light from outside,
- with standardized light (e.g. with a standardized light color etc.),
- from a defined distance, and
- a possibility of changing from one standardized light to another standardized light.

In order to rule out further imponderables, such as the subjective perception and its rating, which depends firstly on specialist knowledge and secondly primarily on the experience and training of the observer, it is further a matter of adequately training the person skilled in the art who carries out the comparative observation of the printed wood material boards to assess color differences.

In a particularly preferred embodiment, the method according to the invention is carried out in such a way that the color deviations between the printed decorations of the wood material boards from the at least one first batch and each further batch or the at least one first wood material board and each further wood material board from one and the same batch are so small that they are barely perceptible by an averagely trained person skilled in the art under the aforementioned standardized conditions. In the sense of the invention, "barely perceptible" means that an averagely trained person skilled in the art does not detect any such difference which would lead to a complaint.

In a quite particularly preferred embodiment, the method according to the invention is accordingly carried out in such a way that no color deviations occur between the printed decorations of the wood material boards from the at least one first batch and each further batch or the at least one first wood material board and each further wood material board from one and the same batch.

Not tolerable according to the invention are color deviations which are perceived by humans at least as clear or high.

This applies to the same extent to color deviations which occur in various areas on the surface of a large-format wood material board. The method according to the present invention is preferably used to prevent or to minimize color deviations which can occur on the surface of a large-format wood material board following the application of a decoration in different areas.

Color deviations can be determined, for example, by the equality method. In this method, by means of a technical device or visually by eye, the sample under examination is compared with a series of known standard samples until equality is reliably established. It is also possible for the selected primary colors to be offered proportionally. Technical implementations are the color circle or the Maxwellian mode of observation. In the first case, a rapid change is made below the time resolution of the measuring instrument or the eye, in the second case, by means of defocusing, a spatial distribution of the primary colors is brought onto an apparently common area and thus is perceived by the eye as a uniform color impression. This method usually makes use of the judgment of equality of the normally sighted eye.

One possible way of assessing the quality of the priming is the determination of the whiteness or the lightness L in the L,a,b color space, or the determination of lightness differences (ΔL) when comparing the lightness between different areas of a wood material board or between different wood material boards. According to the present invention, the lightness difference ΔL is <1.0, preferably <0.9; <0.8; <0.7 or <0.6, particularly preferably <0.5 between different measuring points on the surface of a wood material board and/or between different measuring points on different wood material boards.

Figure 2:
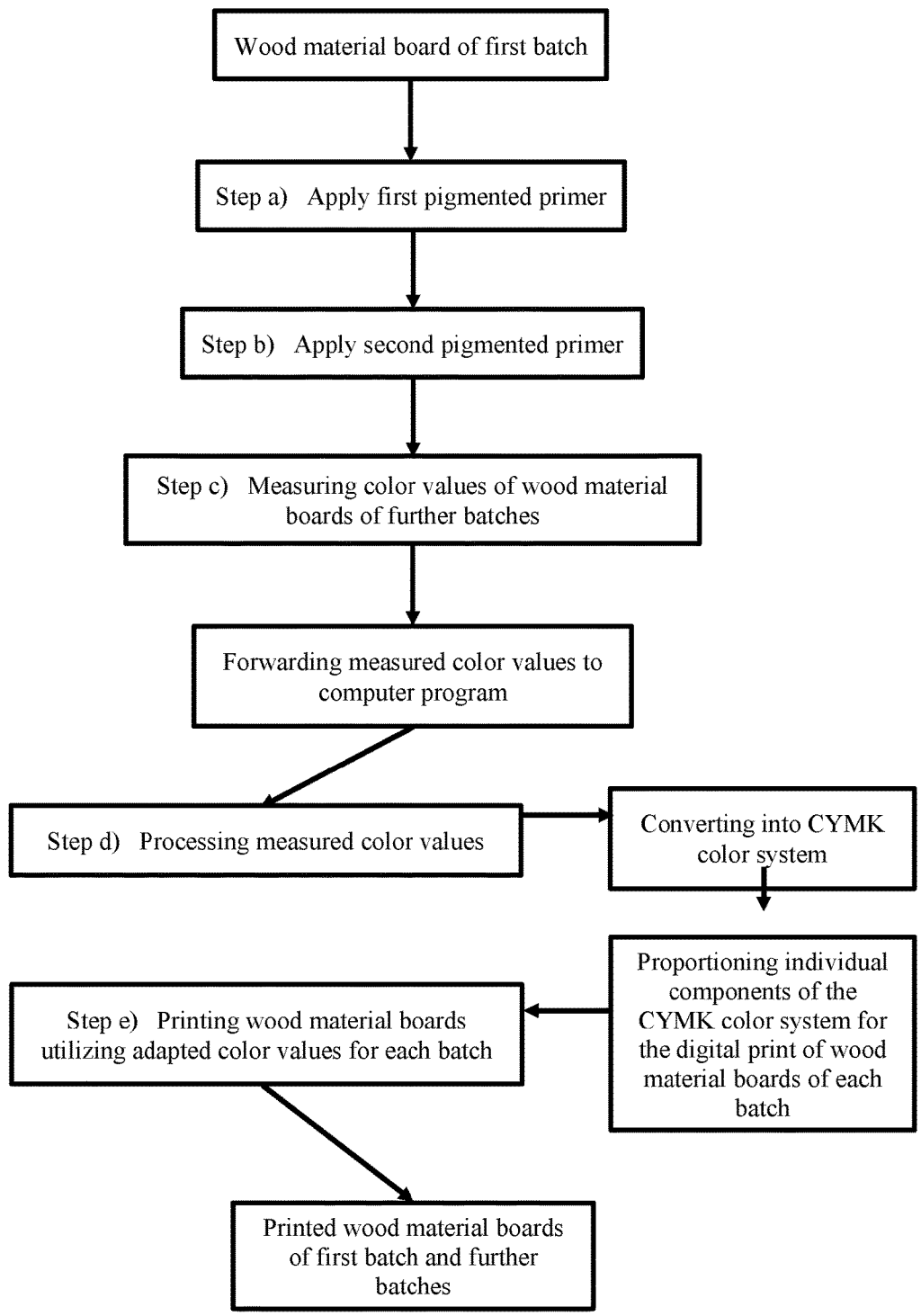
FIG. 2 is a process-flow diagram showing another embodiment of a method according to the present invention.

The following is a discussion of the process illustrated in FIG. 2.

The method according to the invention is suitable for minimizing color deviations between individual boards within a batch of a carrier material, preferably wood material boards. According to the invention, a method for printing wood material boards, in particular wood fiber material boards, by means of a digital printing process is provided, comprising the steps
  a) applying at least one layer of a first pigmented primer to the wood material boards from one batch of the carrier material,
  b) applying at least one layer of a second pigmented primer to the wood material boards,
  c) measuring the color values of the individual wood material boards and forwarding the color values to a computer program;
  d) processing the color values from the individual wood material boards in the computer program and adapting the color values of the digital print for the individual wood material boards;
  e) printing at least one side of the wood material boards by means of digital printing technology, forming a decorative layer in such a way that no color deviations occur between the printed decorations of the individual wood material boards of a batch of the carrier material.

The same procedure can be used if color deviations occur between different batches of a carrier material, preferably of wood material boards.

The method according to the invention then comprises the steps:
a) applying at least one layer of a first pigmented primer to the wood material boards from the at least one first batch and the at least one further batch,
b) applying at least one layer of a second pigmented primer to the wood material boards from the at least one first batch and the at least one further batch,
c) measuring the color values of the wood material boards from the at least one first batch and forwarding the color values to a computer program;
d) measuring the color values of the wood material boards from the at least one further batch and forwarding the color values to the computer program;
e) processing the color values of the wood material boards from the at least one first batch and the at least one further batch in the computer program and adapting the color values of the digital print for the at least one first batch and/or at least one further batch;
f) printing at least one side of the wood material boards by means of digital printing technology, forming a decorative layer in such a way that no color deviations occur between the printed decorations of the wood material boards from the at least one first batch and each further batch.

The color of the first pigmented primer and the second pigmented primer is preferably selected from white or gray. It is particularly preferred if the first pigmented primer applied is in the color gray and the second pigmented primer has the color white.

The pigmented primer in the color gray is preferably applied in 1 to 3 layers, particularly preferably in two layers, most preferably in one layer.

The pigmented primer in the color white can likewise be applied in more than one layer (e.g. 2 to 9 layers, preferably in 3 to 7 layers, particularly preferably in 5 or 6 layers).

A technical effect is associated with the application of the pigmented primers in the colors white and gray as described above. As a result, it is possible to minimize color deviations between the subsequently printed decorations of the wood material boards.

The application both of the gray pigmented primer and of the white pigmented primer is preferably carried out to at least one large-area side of the wood material boards, in particular to the side on which the decoration is subsequently printed. In a particularly preferred embodiment, the method according to the invention comprises applying both the gray pigmented primer and the white pigmented primer to the entire area of at least one large-area side of the wood material boards, in particular to the side on which the decoration is subsequently printed.

Following each layer application, the pigmented primer is dried, e.g. in a convection dryer or a near infrared dryer.

According to one embodiment, the method according to the invention can comprise the continuous measurement of the lightness of the carrier board coated with the preferably water-based pigmented primer.

Depending on the lightness determined, the application quantity of the water-based pigmented primer, which preferably contains titanium dioxide as white pigment, can then be adapted in order to obtain the most uniform possible lightness level of the carrier material. The adaptation of the application quantity can either be carried out automatically by means of a control unit, such as a control computer or process computer, or manually.

The color and lightness measurement can be carried out with conventional color measuring devices. The color and lightness measurement is preferably carried out with an online color measuring device.

However, it is normally not only the lightness of the carrier boards but often also their color which changes between the individual batches of the carrier materials. As a result of the only relatively inaccurately adjustable rolls in the application units for the priming of the carrier boards, the setting of the exact application quantity of the water-based pigmented printing ink is possible only to a restricted extent and leads to an oscillation about the desired lightness value. In addition, influencing the color of the carrier boards by means of the primer containing the white pigments is possible only to a very restricted extent.

This problem is solved by means of a continuous color measurement on the pre-primed light, preferably white, carrier boards in order to determine the color values, and the subsequent processing and utilization of the color data obtained to adapt the color values of the decorative print. Preferably, during the color measurement, the $L^*$, $a^*$ and $b^*$ values in what is known as the $L^*a^*b^*$ color space are determined.

The $L^*a^*b^*$ color space is a color space which covers the range of perceivable colors. The $L^*a^*b^*$ color space is described by a three-dimensional coordinate system. The $L^*$ axis describes the lightness (luminance) of the color with values from 0 (black) to 100 (white). The $a^*$ axis describes the green or red component of a color, negative values representing green and positive values representing red. The $b^*$ axis describes the blue or yellow component of a color, negative values representing blue and positive values representing yellow. The scales of the $a^*$ axis and the $b^*$ axis comprise a numerical range from −150 to +100 and −100 to +150.

In the method according to the invention, the value for the lightness $L^*$ should be at least >50, >60 or >70. Preferably, $L^*$ is >80. In a particularly preferred embodiment, $L^*$ is >85 or >90.

In the method according to the invention, the values for $a^*$ and/or $b^*$ lie in a range between −100 and +100, −80 and +80, −60 and +60, −40 and +40 or −20 and +20. Preferably, the values for $a^*$ and/or $b^*$ lie in a range between −10 and +10. In a preferred embodiment, the values for $a^*$ and/or $b^*$ lie in a range between −5 and +5. In a particularly preferred embodiment of the invention, the values for $a^*$ and/or $b^*$ are close to zero.

The color measurement is carried out by means of a conventional color measuring device, preferably by means of an online color measuring device. The profiling of the color data of the pre-primed carrier board is then carried out by processing the $L^*$, $a^*$ and $b^*$ values determined during the continuous measurement by using a computer program. The computer program used is preferably what is known as RIP software.

RIP (raster imaging process) software is software for calculating color values. In the method according to the invention, during the adaptation of the color data by means of the RIP software, taking the lightness and/or color of the primer into account, a conversion of the measured color values into the standard CYMK color system for digital printing is performed.

Adapting the color values for digital printing means that the proportions of the individual components of the CYMK standard color system are changed. The proportions of the individual components of the CYMK standard color system are preferably changed in such a way that, while taking the determined lightness and the determined color values of the carrier material into account, following the decorative printing no color deviations occur between the printed decorations of the carrier boards from the at least one first batch and each further batch.

In a further embodiment, the method according to the invention optionally comprises the quality control of the colors of the decorations after the digital printing. During this quality control, a check is made to see whether color deviations occur in the decoration between the carrier boards of a carrier material provided with printed decorations or between different areas on the surface of a carrier board. This can be carried out, for example, by means of visual inspection or by means of color measurement.

The printing motifs used for the digital printing can typically be different decorations, such as wood decorations, tile decorations, fantasy decorations or imitation parquet.

In the digital printing, a water-based digital printing ink is preferably used for printing the at least one side of the wood material board. The digital printing can be carried out by using a digital printer with a water-based digital printing ink, a UV-based or solvent-based ink. The use of a water-based digital printing ink is preferred. The quantity of digital printing ink used can be between 5 and 15 g/m$^2$, preferably 6 and 8 g/m$^2$.

In accordance with a further embodiment, the present method provides a protective layer on a digitally printed wood material board, said layer simultaneously being arranged as a promoter, a so-called primer, between intrinsically incompatible layers, such as the decorative print or the decorative layer on the one hand and a following wear resistant layer or other finishing layers, on the other hand.

In the present case, a resin, preferably a water-compatible resin, a radiation-curable, typically non-water-compatible coating, e.g. selected from the group comprising acrylates, modified acrylates and/or epoxides, or else polyurethanes, which have good adhesive properties, can be applied directly to the digital print. Following curing or gelling of the protective layer, intermediate storage of the printed boards is possible without any danger of surface injury or contamination of the decorative layer. Thus, even in the event of undefined time intervals between a processing step comprising digital decorative printing and a further processing step, no problems such as contamination of boards or abrasion and/or separation of the decoration are to be expected. It is therefore also ensured that, in the event of an operating interruption in the further processing, the digital printer does not have to stop working.

In one embodiment, the protective layer to be applied to the decorative layer of the wood material board comprises at least one water-compatible resin, preferably a formaldehyde-containing resin, in particular preferably melamine formaldehyde resin, urea formaldehyde resin and/or melamine urea formaldehyde resin. Accordingly, the resin can be applied in liquid form or else in solid form, the use of a liquid resin being preferred.

After that, the protective layer comprising the at least one water-compatible resin is pre-dried until the resin is still free-flowing and crosslinkable. The drying of the protective layer containing a water-compatible resin is typically carried out in a continuous drying oven, as is known from wood material board production. Depending on the application quantity, the pre-drying process can last for 5 to 15 seconds, preferably 5 to 10 seconds.

If a radiation-curable coating is used as protective layer, the gelling of the protective layer following the application of the protective layer can be carried out by using UV radiation (e.g. at 320-400 nm), ESH radiation and/or NIR radiation. Following the gelling, the coating preferably has a level of polymerization between 20-60%, preferably 30-50%.

In a further variant of the present method, the protective layer to be applied to the printed side of the wood material board is applied in a quantity between 5 and 50 g/m$^2$, preferably 8 and 30 g/m$^2$, in particular preferably 10 and 20 g/m$^2$.

It is likewise possible to apply to the decoration or the decorations at least one protective layer, in particular a layer comprising abrasion-resistant particles, natural fibers, synthetic fibers and/or further additives, wherein resins such as melamine formaldehyde resin or urea formaldehyde resin, acrylate resins and polyurethane resins can be used as suitable binders.

In a further embodiment of the method according to the invention, a plurality of protective layers, which can comprise different additives, are applied to the decoration or the decorations.

In a preferred embodiment, the method according to the invention therefore comprises the further steps:
applying a first resin layer, which contains abrasion-resistant particles, to the side of the wood material board that is provided with the decoration,
drying the first resin layer to a residual moisture content of 3% to 6%; and/or
applying a second resin layer, which contains fibers, to the side of the wood material board that is provided with the decoration,
drying the second resin layer to a residual moisture content of 3% to 6%; and/or
applying an at least third resin layer, which contains glass particles, to the side of the wood material board that is provided with the decoration,
drying the third resin layer to a residual moisture content of 3% to 6%; and
pressing the layer structure under the influence of pressure and temperature in order to form a laminate.

The abrasion-resistant particles are preferably selected from the group containing aluminum oxides, corundum, boron carbides, silicon dioxides, silicon carbides and glass particles. Natural and/or synthetic fibers used are in particular fibers selected from the group containing wood fibers, cellulose fibers, wool fibers, hemp fibers and organic or inorganic polymer fibers.

Conductive substances, flame retardant agents, luminescent substances and metals can be added as additives. The conductive substances can be selected from the group containing carbon black, carbon fibers, metal powder and nanoparticles, in particular carbon nanotubes. Combinations of these substances can also be used. The flame retardant agents used are preferably phosphates, borates, in particular ammonium polyphosphate, tris(tribromoneopentyl) phosphate, zinc borate or boric acid complexes of multivalent alcohols. The luminescent substances used are preferably fluorescent and/or phosphorescent substances on an inorganic or organic basis, in particular zinc sulfide and alkaline earth aluminates.

Preferably, corundum particles are contained in the first resin layer in order to increase the abrasion resistance. This is important in particular in the use as flooring panels, in order to be able to withstand the high loadings to which a flooring panel is subjected. The corundum used is, for example, a mixture of conventional silanized corundums of different grain sizes. The corundum can simply be added to the resin before the application of the latter.

The fibers used in the second resin layer are preferably cellulose fibers. Commercially available fibers, which can likewise be added to the resin layers to be applied, can be used for this purpose.

The glass particles contained in the third resin layer are, for example, commercially available micro glass spheres. These can also simply be introduced into the resin layer to be applied.

The third resin layer preferably contains a proportion of 20% glass particles. For the second resin layer, about 5% cellulose has proven to be advantageous. The first resin layer contains in particular 20% corundum particles.

In a further embodiment of the method according to the invention, one or more resin layers can also be applied to the underside of the wood material board. As a result, in particular the tensile forces acting as a result of the resin layers applied to the upper side of the wood material board are compensated. In a particularly preferred embodiment, the resin layers respectively applied to the upper side and underside are applied in the same quantity or the counterbalance applied to the underside of the wood material board corresponds exactly in terms of layer structure and respective layer thickness to the layer sequence applied to the upper side.

The resin layers applied to the underside of the wood material board can be colored.

Additives such as hardeners, wetting and release agents can be added to all the resin layers.

The resin layers on the upper side and the underside of the wood material board can contain a 60% synthetic resin solution.

The drying to a residual moisture content of 3% to 6% is used to suppress the crosslinking process of the resin layers applied.

In a further embodiment of the present method, the carrier material printed and possibly provided with one or more protective layer(s) is further processed or finished in a short-cycle press. Under the influence of pressure and temperature in a short-cycle press, the resin layers melt again. The crosslinking process thus continues. The individual resin layers are thus not only crosslinked in themselves but also with one another. As a result, the melamine resin layers applied can be crosslinked while including the decoration and cured to form a laminate. Conventional short-cycle presses operate, for example, with a pressure of 30 to 60 kg/cm², a temperature on the wood material surface of about 165° C. and a pressing time of 6 to 12 seconds.

During the further processing in the short-cycle press, by using a structured press platen, surface structures can also be produced in at least one surface, preferably at least the upper side of the carrier material such as a wood material board, and can optionally be coordinated with the decoration (so-called decoration-synchronous structure). The surface structures are preferably formed largely congruently with the decoration. In this case, one speaks of embossed-in-register structures. In the case of wood decorations, the structures can be present in the form of pore structures, which follow the grain. In the case of tile decorations, the structures can be depressions in the area of joint filling lines comprised by the decoration.

In a particularly preferred embodiment, the method according to the invention comprises the steps:
a) grinding the wood material boards from at least one first batch,
b) applying a primer to wood material boards from at least one first batch,
c) applying at least one layer of a first pigmented primer to the wood material boards from the at least one first batch,
d) applying at least one layer of a second pigmented primer to the wood material boards from the at least one first batch,
e) measuring the color values of the wood material boards from at least one first batch and forwarding the color values to a computer program;
f) processing the color values of the wood material boards from the at least one first batch in the computer program and adapting the color values of the digital print;
g) printing at least one side of the wood material boards by means of digital printing technology, forming a decorative layer in such a way that no color deviations occur between the printed decorations of the wood material boards from the at least one first batch;
h) applying at least one protective layer containing at least one resin, at least one radiation-curable coating and/or at least one polyurethane to the decorative layer; and
i) drying and/or gelling the protective layer applied to the decorative layer;
and optionally
j) quality control of the colors of the decorations after the digital printing.

If color deviations between the wood material boards from different batches are to be minimized, in a particularly preferred embodiment the method according to the invention comprises the steps:
a) grinding the wood material boards from at least one first batch and at least one further batch,
b) applying a primer to wood material boards from at least one first batch and at least one further batch,
c) applying at least one layer of a first pigmented primer to the wood material boards from the at least one first batch and the at least one further batch,
d) applying at least one layer of a second pigmented primer to the wood material boards from the at least one first batch and the at least one further batch,
e) measuring the color values of the wood material boards from at least one first batch and forwarding the color values to a computer program;
f) measuring the color values of the wood material boards from at least one further batch and forwarding the color values to the computer program;
g) processing the color values of the wood material boards from the at least one first batch and/or the at least one further batch in the computer program and adapting the color values of the digital print;
h) printing at least one side of the wood material boards by means of digital printing technology, forming a decorative layer in such a way that no color deviations occur between the printed decorations of the wood material boards from the at least one first batch and each further batch;
i) applying at least one protective layer comprising at least one resin, at least one radiation-curable coating and/or at least one polyurethane to the decorative layer; and
j) drying and/or gelling the protective layer applied to the decorative layer;
and optionally
k) quality control of the colors of the decorations after the digital printing.

The present method is carried out in an apparatus for adapting decorative prints on carrier materials, wherein the apparatus comprises the following elements:
- at least one means for measuring the color values of the carrier material,
- at least one means for adapting the color data,
- at least one printing line having at least one digital printer for printing at least one side of the carrier material by means of digital printing technology, forming a decorative layer in such a way that no color deviations occur between the printed decorations of the carrier material from the at least one first batch or between the printed decorations of the carrier material from the at least one first batch and each further batch.

In a further variant, the present apparatus comprises at least one means or an apparatus for applying a primer to the carrier material.

In a preferred variant, the apparatus according to the invention comprises at least one means or an apparatus for applying a pigmented white primer, which is preferably water-based, to the carrier material.

In a particularly preferred variant, the apparatus according to the invention comprises at least one means or an apparatus for applying a pigmented gray primer, which is preferably water-based, to the carrier material.

Both the gray and the white priming can be carried out in an analog manner, for example by means of a roll applicator, or digitally, for example by means of an inkjet printer.

In a further preferred embodiment, the apparatus comprises at least one means for measuring the lightness of the carrier material coated with the pigmented primer, which is preferably water-based.

The means and apparatuses for applying the primer and/or the pigmented primer and the measurement of the lightness of the carrier material are preferably arranged before the at least one means for measuring the color values of the carrier material, i.e. the $L^*a^*b^*$ color values.

In a further variant, the present apparatus comprises at least one means for applying at least one protective layer to the carrier material provided with the respective printed decoration. This means or apparatus for applying a protective layer is preferably arranged after the at least one printing line.

Preferably, the apparatus contains a plurality of means for applying a plurality of protective layers to the carrier material provided with the respective printed decoration. In a particularly preferred embodiment, the apparatus contains two, three or four means for applying two, three or four protective layers to the carrier material provided with the respective printed decoration.

The apparatus according to the invention can also additionally comprise one or more means for applying one or more resin layers to the underside of the carrier material. If the upper side and the underside of the carrier material are to be provided with protective layers, the means for applying the protective layers can be implemented, for example, as double application apparatuses.

In a preferred embodiment, the present apparatus comprises at least one means for measuring the color values of the carrier material provided with the printed decoration for quality control.

In a further embodiment, the present apparatus has at least one short-cycle press for pressing the carrier material provided with the printed decoration and the protective layer arranged thereon.

The method described in the present case has the advantage that rapid provision of color-matched products which, despite color fluctuations of the carrier material or in the priming of the carrier material, have no significant color deviations is possible. Even extremely small color fluctuations of the carrier material or in the priming of the carrier material can be determined directly in the process and corrected. To this extent, the method described in the present case constitutes a self-controlling system. The method additionally leads to a reduction in costs in the production process as a result of minimizing the production of defective products or products with undesired color deviations in the decoration produced by means of digital printing, since account is already taken in advance of the color fluctuations of the carrier material or in the priming of the carrier material, before the printing, and, as a result, the digital printing is already carried out with adapted and optimized color values.

The present invention further provides a wood material board, preferably a wood fiber material board, which has been produced in accordance with the method of the invention. In a particularly preferred embodiment, the invention provides a wood material board which comprises a first pigmented primer and a second pigmented primer, wherein the first pigmented primer preferably has the color gray and the second pigmented primer preferably has the color white. It is preferred if the pigmented gray primer has been applied to the wood material board in 1 to 3 layers, particularly preferably in two layers, most preferably in one layer. It is further preferred if the pigmented white primer has been applied to the wood material board in 2 to 9 layers, preferably 3 to 7 layers, particularly preferably 5 or 6 layers.

The method according to the invention has a number of advantages. The wood material boards produced with the method according to the invention exhibit higher opacity and homogeneity on the surface coated with the pigmented gray primer and the pigmented white primer as compared with conventionally primed wood material boards. This acts advantageously for the following application of a decoration, preferably by means of digital printing. The decoration subsequently applied is characterized by the color consistency over the entire board area.

The invention will be described in more detail below by using three exemplary embodiments.

EXEMPLARY EMBODIMENTS

Example 1: Production of Wood Material Boards with White Primer

A ground HDF board (7 mm, 2800×2070 mm) was firstly provided with a colorless primer (20 g primer/m$^2$, solids: 65%) in roll applicator machines, then provided with a white primer and dried. The application of the white primer was 30 μm. This HDF board was then provided with two further color applications of respectively 8 to 9 g/m$^2$ white in two further roll applicator machines and measured repeatedly colorimetrically in all three intermediate steps, the measuring points being distributed regularly over the board.

The following values were determined with a white primer:

TABLE 1

Board 1 with first application of white, application thickness 30 μm (corresponding to about 45 g primer per m$^2$)

|   | L | a | b |
|---|---|---|---|
| Measured value 1 | 96.08 | −0.56 | 1.66 |
| Measured value 2 | 96.64 | −0.48 | 1.98 |
| Measured value 3 | 96.48 | −0.49 | 1.84 |
| Measured value 4 | 96.05 | −0.54 | 1.66 |

TABLE 1-continued

Board 1 with first application of white, application thickness
30 μm (corresponding to about 45 g primer per m²)

|  | L | a | b |
|---|---|---|---|
| Measured value 5 | 95.21 | −0.64 | 1.17 |
| Measured value 6 | 96.64 | −0.48 | 1.98 |
| Maximum deviation: | 1.43 | 0.15 | 0.81 |

TABLE 2

Board 1 with first white application and second white
application with about 8 to 9 g primer per m²

|  | L | a | b |
|---|---|---|---|
| Measured value 1 | 96.59 | −0.45 | 1.53 |
| Measured value 2 | 96.68 | −0.37 | 1.96 |
| Measured value 3 | 95.83 | −0.56 | 1.14 |
| Measured value 4 | 96.33 | −0.43 | 1.67 |
| Measured value 5 | 96.67 | −0.43 | 1.73 |
| Measured value 6 | 96.57 | −0.48 | 1.55 |
| Maximum deviation: | 0.85 | 0.19 | 0.82 |

TABLE 3

Board 1 with first white application and second white
application with about 8 to 9 g primer per m², and third
white application with about 8 to 9 g primer per m²

|  | L | a | b |
|---|---|---|---|
| Measured value 1 | 97.13 | −0.34 | 1.6 |
| Measured value 2 | 96.89 | −0.49 | 1.28 |
| Measured value 3 | 97.16 | −0.38 | 1.43 |
| Measured value 4 | 96.15 | −0.42 | 1.14 |
| Measured value 5 |  |  |  |
| Measured value 6 |  |  |  |
| Maximum deviation: | 1.01 | 0.15 | 0.46 |

Assessment of the Result

With a color application with pigmented white primer in the specified layer thickness of 30 μm, a difference in the lightness values of 1.43 ΔL was determined. This points to inadequate coverage of the white color on the background and leads to problems when printing the board in the digital printing process, in particular to color deviations. A tolerance limit in the region of 0.5 ΔL should not be exceeded. However, even after two further white applications of respectively 8 and 9 g of primer per m², the difference in the L value was still >1 ΔL.

Measurement Method

Spectral Technology

Spectral Analysis: DRS technology

Spectral Range: 400-700 nm at 10 mm intervals

Optics

Measurement Geometry: 45°/0°, annular illumination optics, ISO 5-4:2009(E)

Light Source: gas-filled tungsten incandescent lamp (light type A) and UV LED

Measurement Conditions: according to ISO 13655:2009 (D50)

Manufacturer: X-Rite

Model: Exact

The whiteness measurement according to ISO 13655:2009 was carried out with the measuring device illustrated above at various measuring points within the test board.

Example 2: Production of Wood Material Boards with Gray Primer

A ground HDF board (7 mm, 2800×2070 mm) was firstly provided with a colorless primer (20 g primer/m², solids: 65%) in roll applicator machines, then provided with a gray primer (mixture ratio 100 g white primer with an addition of 3 g black printing ink on a water basis) and dried. The application of the gray primer was 30 μm. This HDF board was then provided with two further white color applications of respectively 8 and 9 g primer per m² in two further roll applicator machines and measured repeatedly colorimetrically after all three intermediate steps, the measuring points being distributed regularly over the board.

The following values were determined with a gray primer:

TABLE 4

Board 2 with first application of gray, application thickness
30 μm (corresponding to about 45 g primer per m²)

|  | L | a | b |
|---|---|---|---|
| Measured value 1 | 80.34 | −0.66 | −0.31 |
| Measured value 2 | 80.47 | −0.68 | −0.19 |
| Measured value 3 | 80.41 | −0.67 | −0.17 |
| Measured value 4 | 80.54 | −0.68 | −0.22 |
| Measured value 5 | 80.44 | −0.69 | −0.19 |
| Measured value 6 | 80.43 | −0.69 | −0.15 |
| Maximum deviation: | 0.2 | 0.03 | 0.16 |

TABLE 5

Board 2 with first application (gray) and second application
(white) with about 8 to 9 g primer per m²

|  | L | a | b |
|---|---|---|---|
| Measured value 1 | 89.16 | −1.14 | −1.59 |
| Measured value 2 | 89.36 | −1.14 | −1.56 |
| Measured value 3 | 89.19 | −1.12 | −1.46 |
| Measured value 4 | 89.36 | −1.13 | −1.52 |
| Measured value 5 | 89.2 | −1.13 | −1.46 |
| Measured value 6 | 89.62 | −1.13 | −1.58 |
| Maximum deviation: | 0.46 | 0.03 | 0.13 |

TABLE 6

Board 2 with first application (gray) and second application
(white) with about 8 to 9 g primer per m², and third application
of about 8 to 9 g primer per m² (white)

|  | L | a | b |
|---|---|---|---|
| Measured value 1 | 92.46 | −1.05 | −1.18 |
| Measured value 2 | 92.56 | −1.05 | −1.06 |
| Measured value 3 | 92.66 | −1.03 | −1.04 |
| Measured value 4 | 92.27 | −1.04 | −1.05 |
| Measured value 5 |  |  |  |
| Measured value 6 |  |  |  |
| Maximum deviation: | 0.39 | 0.03 | 0.14 |

Assessment of the Result

With a color application with gray pigmented primer in the specified layer thickness of 30 μm, a difference in the lightness values of 0.2 ΔL was determined. The result shows higher homogeneity and opacity of the background. However, with this application, the lightness value is lower than in the case of a white application. Following two further white applications of respectively 8 to 9 g primer per m², this stability is maintained and the lightness value of the background rises considerably (about L=+12). In comparison with the white primer, in the case of the "gray" primer the fluctuations of the L, a, b values are reduced considerably. In addition, in the case of the b value, the absolute value lies closer to the neutral gray axis.

Measurement Method
Spectral Technology
Spectral Analysis: DRS technology
Spectral Range: 400-700 nm at 10 mm intervals
Optics
Measurement Geometry: 45°/0°, annular illumination optics, ISO 5-4:2009(E)
Light Source: gas-filled tungsten incandescent lamp (light type A) and UV LED
Measurement Conditions: according to ISO 13655:2009 (D50)
Manufacturer: X-Rite
Model: Exact The whiteness measurement according to ISO 13655:2009 was carried out with the measuring device illustrated above at various measuring points within the test board.

Both the gray and white priming can be carried out in an analog manner, for example by means of a roll applicator unit, or digitally, for example by means of an inkjet printer.

Subsequent printing of the two pre-primed boards, in particular by means of a digital printer, produced no visible deviations in the printed image in the case of the "gray" primer, as opposed to the board having the white primer. With the aid of the RIP software (raster imaging process) of the digital printer, the adaptation to a primer which, overall, has a somewhat lower lightness but is more homogenous is possible better than an intrinsically less homogenous primer.

Example 3: Further Processing of the HDF Boards

Boards 1 and 2 were then coated on the printed side with a first layer of melamine resin which contained 20% corundum particles, and then dried in a drying oven to a residual moisture content of 4%.

After that, all the boards were coated on the printed side with a second layer of melamine resin which contained 5% cellulose fibers, and then dried in a drying oven to a residual moisture content of 4%.

After that, all the boards were coated on the printed side with a third melamine resin layer which contained 20% micro glass spheres, and dried in a drying oven, likewise to a residual moisture content of 4%.

Finally, the curing of the three melamine resin layers to form a laminate was carried out in a short-cycle press at a pressure of 50 kg/cm$^2$, a temperature on the wood material surface of about 165° C. and a pressing time of 10 seconds.

The decorations of the boards from batch I and from batch II were compared with one another following each coating step and following the pressing in the short-cycle press. Here, following the application of the individual melamine resin layers and also after passing through the short-cycle press, no significant color deviations could be detected.

The invention claimed is:

1. A method for printing on wood material boards, in particular wood fiber material boards, by means of a digital printing process forming a digital print, comprising the steps of:
    a) applying at least one layer of a first pigmented primer to the wood material boards from one batch of the carrier material,
    b) applying at least one layer of a second pigmented primer to the wood material boards,
    c) measuring the color values of the individual wood material boards after application of the first and second pigmented primers and forwarding the measured color values to a computer program;
    d) processing the measured color values from the individual wood material boards in the computer program and adapting color values of the digital print for each of the individual wood material boards by at least converting the measured color values into the CYMK color system and proportioning individual components of the CYMK color system for the digital print for each of the individual wood material boards based on the converted measured color values; and
    e) printing at least one side of the wood material boards by means of digital printing technology, utilizing the adapted color values to form a decorative layer in such a way that no color deviations occur between the printed decorations of the individual wood material boards of a batch of the carrier material.

2. The method as claimed in claim 1, wherein the color of the first pigmented primer and the second pigmented primer is selected from white or gray.

3. The method as claimed in claim 1, wherein the color of the first pigmented primer is gray and the color of the second pigmented primer is white.

4. The method as claimed in claim 1, wherein application quantity of the first pigmented primer and/or the second pigmented primer is adapted in order to obtain the most uniform lightness level of the carrier material.

5. The method as claimed in claim 1, wherein, before the printing, at least one primer layer comprising at least one resin and/or at least one coating, which is subsequently dried and/or cured, is applied to the side of the wood material board that is to be printed.

6. The method as claimed in claim 5, wherein, for the priming, an aqueous resin solution and/or a radiation-curable filler compound is applied to the side of the wood material board that is to be printed.

7. The method as claimed in claim 1, wherein a water-based, UV-based or solvent-based digital printing ink is used to print the at least one side of the wood material board.

8. The method as claimed in claim 1, wherein, after the printing, at least one protective layer which comprises at least one water-compatible resin, preferably a formaldehyde-containing resin, in particular preferably melamine formaldehyde resin, urea formaldehyde resin and/or melamine urea formaldehyde resin, is applied to the decorative layer of the wood material board.

9. The method as claimed in claim 1, wherein the at least one protective layer to be applied to the decorative layer of the wood material board comprises at least one radiation-curable coating selected from the group comprising acrylates, modified acrylates and/or epoxides, or comprises at least one polyurethane selected from the group containing aliphatic urethanes or a mixture of at least one radiation-curable coating and at least one polyurethane.

10. The method as claimed in claim 1, wherein following the printing, a plurality of protective layers of a water-compatible resin are applied to the decorative layer of the wood material board, further comprising the steps of:
    applying a first resin layer, which contains abrasion-resistant particles,
    drying the first resin layer to a residual moisture content of 3% to 6%; and/or
    applying a second resin layer, which contains fibers,
    drying the second resin layer to a residual moisture content of 3% to 6%; and/or applying an at least third resin layer, which contains glass particles, drying the third resin layer to a residual moisture content of 3% to 6%; and pressing the layer structure under the influence of pressure and temperature in a short cycle press in order to form a laminate, wherein the pressing of the layer structure in the short-cycle press is optionally carried out with the simultaneous formation of a structure which is preferably matched to the decoration of the wood material board, at least on the upper side of the laminate.

11. The method as claimed in claim 1, wherein the color deviations between the printed decorations of each of the individual wood material boards of a batch of the carrier material are so low that they are barely perceptible.

12. A method for printing on wood material boards, in particular wood fiber material boards, by means of a digital printing process, comprising the steps of:
 a) applying at least one layer of a first pigmented primer to the wood material boards from the at least one first batch and the at least one further batch,
 b) applying at least one layer of a second pigmented primer to the wood material boards from the at least one first batch and the at least one further batch,
 c) measuring the color values of the wood material boards from the at least one first batch after application of the first and second pigmented primers and forwarding the color values to a computer program;
 d) measuring the color values of the wood material boards from the at least one further batch after application of the first and second pigmented primers and forwarding the color values to the computer program;
 e) processing the measured color values of the wood material boards from the at least one first batch and the at least one further batch in the computer program and adapting color values of the digital print for the at least one first batch and/or at least one further batch by at least converting the measured color values into the CYMK color system and proportioning individual components of the CYMK color system for the digital print for the at least one first batch and/or at least one further batch based on the converted measured color values; and
 f) printing at least one side of the wood material boards by means of digital printing technology, utilizing the adapted color values to form a decorative layer in such a way that no color deviations occur between the printed decorations of the wood material boards from the at least one first batch and each further batch.

13. The method as claimed in claim 12, wherein the color of the first pigmented primer and the second pigmented primer is selected from white or gray.

14. The method as claimed in claim 12, wherein the color of the first pigmented primer is gray and the color of the second pigmented primer is white.

15. The method as claimed in claim 12, wherein the application quantity of the first pigmented primer and/or the second pigmented primer is adapted in order to obtain the most uniform lightness level of the carrier material.

16. The method as claimed in claim 12, wherein, before the printing, at least one primer layer comprising at least one resin and/or at least one coating, which is subsequently dried and/or cured, is applied to the side of the wood material board that is to be printed.

17. The method as claimed in claim 16, wherein, for the priming, an aqueous resin solution and/or a radiation-curable filler compound is applied to the side of the wood material board that is to be printed.

18. The method as claimed in claim 12, wherein a water-based, UV-based or solvent-based digital printing ink is used to print the at least one side of the wood material board.

19. The method as claimed in claim 12, wherein, after the printing, at least one protective layer which comprises at least one water-compatible resin, preferably a formaldehyde-containing resin, in particular preferably melamine formaldehyde resin, urea formaldehyde resin and/or melamine urea formaldehyde resin, is applied to the decorative layer of the wood material board.

20. The method as claimed in claim 12, wherein the at least one protective layer to be applied to the decorative layer of the wood material board comprises at least one radiation-curable coating selected from the group comprising acrylates, modified acrylates and/or epoxides, or comprises at least one polyurethane selected from the group containing aliphatic urethanes or a mixture of at least one radiation-curable coating and at least one polyurethane.

21. The method as claimed in claim 12, wherein following the printing, a plurality of protective layers of a water-compatible resin are applied to the decorative layer of the wood material board, further comprising the steps of:
 applying a first resin layer, which contains abrasion-resistant particles,
 drying the first resin layer to a residual moisture content of 3% to 6%; and/or
 applying a second resin layer, which contains fibers,
 drying the second resin layer to a residual moisture content of 3% to 6%; and/or
 applying an at least third resin layer, which contains glass particles,
 drying the third resin layer to a residual moisture content of 3% to 6%; and
 pressing the layer structure under the influence of pressure and temperature in a short cycle press in order to form a laminate,
 wherein the pressing of the layer structure in the short-cycle press is optionally carried out with the simultaneous formation of a structure which is preferably matched to the decoration of the wood material board, at least on the upper side of the laminate.

22. The method as claimed in claim 12, wherein the color deviations between the printed decorations of the wood material boards from the at least one first batch and each further batch are so low that they are barely perceptible.

* * * * *

UNITED STATES PATENT AND TRADEMARK OFFICE
CERTIFICATE OF CORRECTION

PATENT NO. : 10,063,747 B2
APPLICATION NO. : 14/695429
DATED : August 28, 2018
INVENTOR(S) : Norbert Kalwa et al.

Page 1 of 1

It is certified that error appears in the above-identified patent and that said Letters Patent is hereby corrected as shown below:

On the Title Page

Column 1, after "US 2015/0306888 A1 Oct. 29, 2015", insert:
-- (30) Foreign Application Priority Data
Apr. 24, 2014   (EP)..............................................................14 165 828.6-1704 --

In the Claims

Column 20, Line 9, Claim 1, delete "CYMK" and insert -- CMYK --

Column 20, Line 11, Claim 1, delete "CYMK" and insert -- CMYK --

Column 21, Line 40, Claim 12, delete "CYMK" and insert -- CMYK --

Column 21, Line 41, Claim 12, delete "CYMK" and insert -- CMYK --

Signed and Sealed this
Fourth Day of December, 2018

Andrei Iancu
*Director of the United States Patent and Trademark Office*